US008763820B2

(12) United States Patent
Hanley

(10) Patent No.: US 8,763,820 B2
(45) Date of Patent: Jul. 1, 2014

(54) RACK AND TRAY DEVICE

(76) Inventor: Charles L. Hanley, Woonsocket, RI (US)

(*) Notice: Subject to any disclaimer, the term of this patent is extended or adjusted under 35 U.S.C. 154(b) by 222 days.

(21) Appl. No.: 12/456,934

(22) Filed: Jun. 24, 2009

(65) Prior Publication Data

US 2010/0326936 A1 Dec. 30, 2010

(51) Int. Cl.
*B62D 33/08* (2006.01)
*A47F 5/08* (2006.01)

(52) U.S. Cl.
USPC .................................. 211/88.01; 296/26.09

(58) Field of Classification Search
USPC ................. 211/70.1, 90.01, 126.15, 88.01;
312/242, 245, 257.1, 265.1–265.4,
312/301, 321, 330.1, 334.7, 351.1, 351.14;
296/37.13, 37.16, 26.09, 24.44, 24.45;
414/522
See application file for complete search history.

(56) References Cited

U.S. PATENT DOCUMENTS

| 95,236 | A | * | 9/1869 | Lamb et al. ................. 296/24.45 |
|---|---|---|---|---|
| 1,720,260 | A | | 7/1929 | Bowen, Jr. et al. |
| 1,880,072 | A | * | 9/1932 | Christian ...................... 379/328 |
| 2,690,136 | A | * | 9/1954 | Freeman ........................ 104/121 |
| 2,729,498 | A | * | 1/1956 | Law ............................. 296/24.4 |
| 2,766,959 | A | * | 10/1956 | Duncan ......................... 248/248 |
| 2,784,027 | A | * | 3/1957 | Temp ............................ 296/156 |
| 2,825,617 | A | * | 3/1958 | Morgan ......................... 312/351 |
| 3,589,768 | A | * | 6/1971 | Wilson .......................... 296/24.4 |
| 3,757,967 | A | | 9/1973 | Colbridge |
| 4,030,609 | A | | 6/1977 | Liebetrau et al. |
| 4,131,203 | A | | 12/1978 | Bridges |
| 4,482,066 | A | * | 11/1984 | Dykstra ........................ 211/151 |
| 4,681,381 | A | * | 7/1987 | Sevey ........................... 312/333 |
| 4,701,086 | A | * | 10/1987 | Thorndyke ..................... 410/26 |
| 4,705,315 | A | | 11/1987 | Cherry |
| 4,889,377 | A | * | 12/1989 | Hughes .......................... 296/3 |
| 4,899,895 | A | * | 2/1990 | Espasandin et al. ........ 211/85.18 |
| 5,064,335 | A | * | 11/1991 | Bergeron et al. .............. 414/522 |
| 5,269,447 | A | | 12/1993 | Gower et al. |
| 5,571,256 | A | * | 11/1996 | Good et al. ..................... 211/26 |
| 5,785,401 | A | * | 7/1998 | Bowyer et al. ................ 312/350 |
| 5,845,952 | A | * | 12/1998 | Albertini et al. .............. 296/37.6 |
| 6,065,792 | A | * | 5/2000 | Sciullo et al. ............... 296/26.09 |
| 6,244,646 | B1 | * | 6/2001 | Wheeler, III ............... 296/26.01 |
| 6,758,508 | B2 | * | 7/2004 | Weyhrich .................... 296/26.09 |
| 7,219,952 | B2 | * | 5/2007 | Taylor .......................... 296/182.1 |
| 7,232,172 | B2 | * | 6/2007 | Kiester et al. ................ 296/39.2 |

(Continued)

OTHER PUBLICATIONS http://www.prolinedistributorsinc.com/gallery/mini_van/minivangallery.html...contact.html Apr. 10, 2008 Internet Archive Wayback Machine.*

(Continued)

*Primary Examiner* — Joshua Rodden
*Assistant Examiner* — Stanton L Krycinski
(74) *Attorney, Agent, or Firm* — Leo G. Lenna; Sorell, Lenna & Schmidt LLP

(57) ABSTRACT

A rack and tray device formed from a pair of side panels mountable on the floor of an area and attached to the sides of the area, such as the inside of a van. Guide members are on the side panels and include a channel shape extending inward to accept a tray member carried by the channel shape and maintained in a substantially horizontal orientation when objects are placed on the at least one tray member. The guide members are slidably mounted to further support the tray and prevent it from tipping.

20 Claims, 3 Drawing Sheets

(56) References Cited

U.S. PATENT DOCUMENTS

| 7,258,317 | B1 | 8/2007 | Nagel | |
|---|---|---|---|---|
| 7,338,110 | B1 | 3/2008 | Eckloff | |
| 7,543,872 | B1 * | 6/2009 | Burns et al. | 296/26.09 |
| 7,543,873 | B1 * | 6/2009 | Thornsberry | 296/26.09 |
| 7,712,812 | B2 * | 5/2010 | Gagliano | 296/26.09 |
| 2006/0273605 | A1 * | 12/2006 | Haspel et al. | 296/26.09 |
| 2007/0069542 | A1 * | 3/2007 | Steiger et al. | 296/24.44 |

OTHER PUBLICATIONS

Guide and Checklist for Nonstructural Earthquake Hazards in California Schools, Safer School, Dec. 20, 2002.*
Jul. 26, 2004, Masterrack Commerical Vehicle Equipment Catalog.*
International Search Report, mailed May 21, 2010.

* cited by examiner

RACK AND TRAY DEVICE

BACKGROUND

The present invention relates to a rack and tray device for use in an enclosed area having a floor and side walls. More particularly it relates to a device that can be mounted in an area of a vehicle, such as a van or other truck, at a location in the vehicle where access to the device is provided via a door or doors, such as the back doors of a van, whereby the tray or trays held by the device can be partially or totally removed to give access to objects on the tray or trays.

Trucks and other vehicles often are manufactured and sold in a generic condition and are customized or added to when sold to a specific industry. For example, construction company trucks have special boxes and racks to store tools and equipment, and to provide access to them. Delivery trucks have different requirements.

Sometimes all that is delivered from the vehicle manufacturer is the chassis of the truck, leaving the inside of the vehicle to be fitted with shelves or racks as determined by the user. It would be a great advance in the trucking industry if a device could be provided for basic vehicles such as vans that would provide a rack and tray assembly to permit a variety of uses for the vehicle.

SUMMARY

The present invention is a rack and tray assembly that serves as a primary storage area on the tray or trays, and that is fixedly mounted to the area. The device includes a frame or rack that is preferably rectangular in shape and is sized to fit in an area such as, but not limited to, the back of a van or cargo truck.

The rack is mounted on the floor of the area and is further attached to the sides of the area, such as the sides of a van for example. The rack further includes at least one pair of guide members in the shape of a channel with the sides of the channel mounted on the rack and the top and bottom of the channel sized to hold a tray. In a preferred embodiment, the channel is slidably mounted on a cross member of the frame so that it extends out as the tray is being moved out to further support the tray and prevent it from tipping or rotating to the vertical.

DETAILED DESCRIPTION

Figure 1:
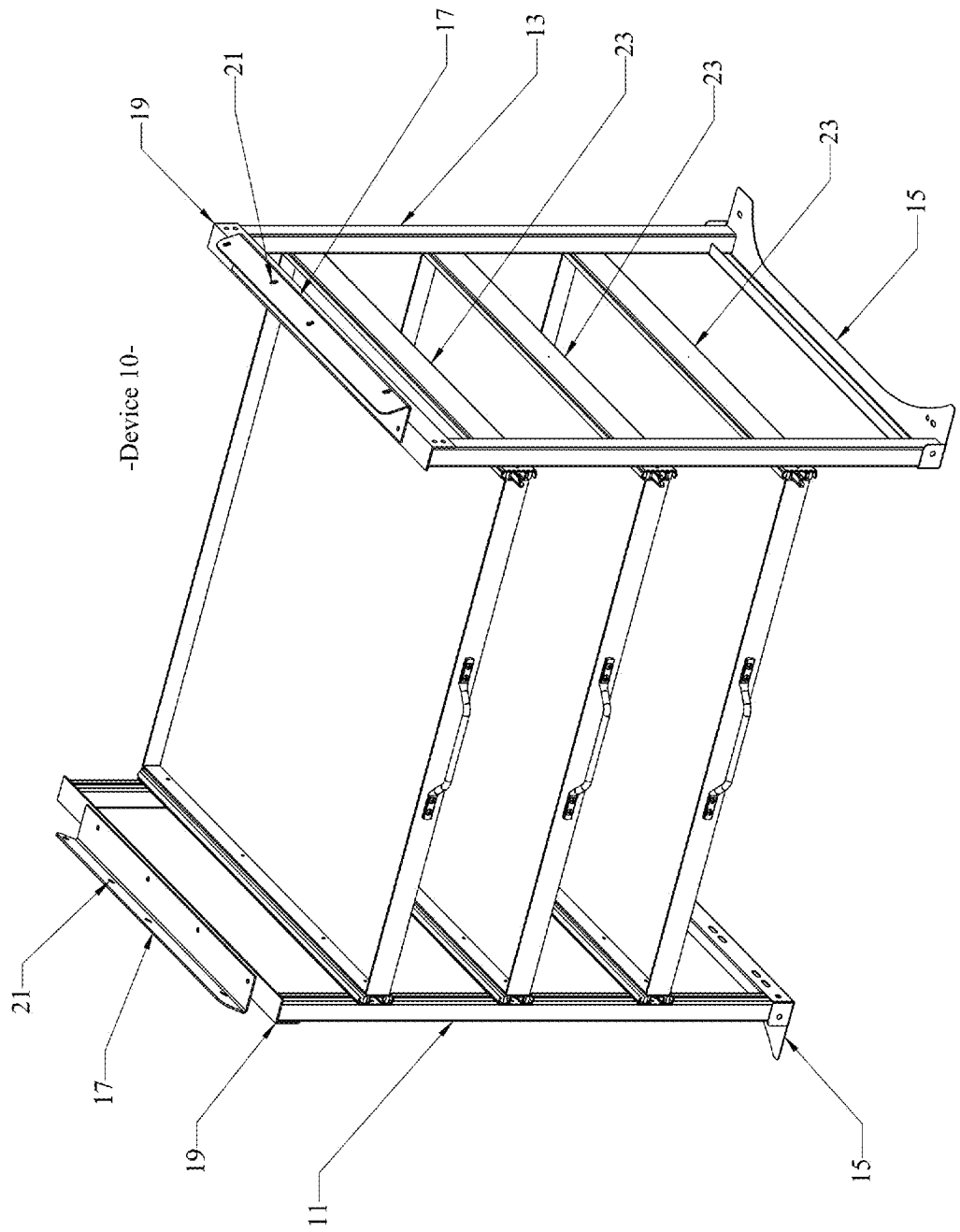
FIG. 1 is a perspective view of the device of this invention.

The device of this invention 10 generally in FIG. 1 comprises a rack and tray device that is used in an enclosed area having a floor and walls or other vertical supports to which the device is attached. The device 10 is described as being used in a van type vehicle with two back doors that swing open wider than the device and where the floor and walls of the vehicle are suitable for mechanical attachment of the device such as with nuts and bolts. It is to be understood that other vehicles and other areas such as sheds and the like are also contemplated as being within the scope of this invention.

Device 10 includes a pair of side panels 11 and 13, shown as rectangles in FIG. 1. Side panels 11 and 13 may be other shapes as well since the function is to attach to the area walls and floor and support the remaining elements. Side panels 11 and 13 have a bracket 15 at the bottom for fastening to the floor of the area, such as the floor of a van. Side panels 11 and 13 also have a bracket 17 at the top member 19 of both side panels 11 and 13, shown as an "L" shaped member with bolt holes 21. Side panels also have cross members 23 at every location where a tray is to be inserted and supported.

Figure 2:
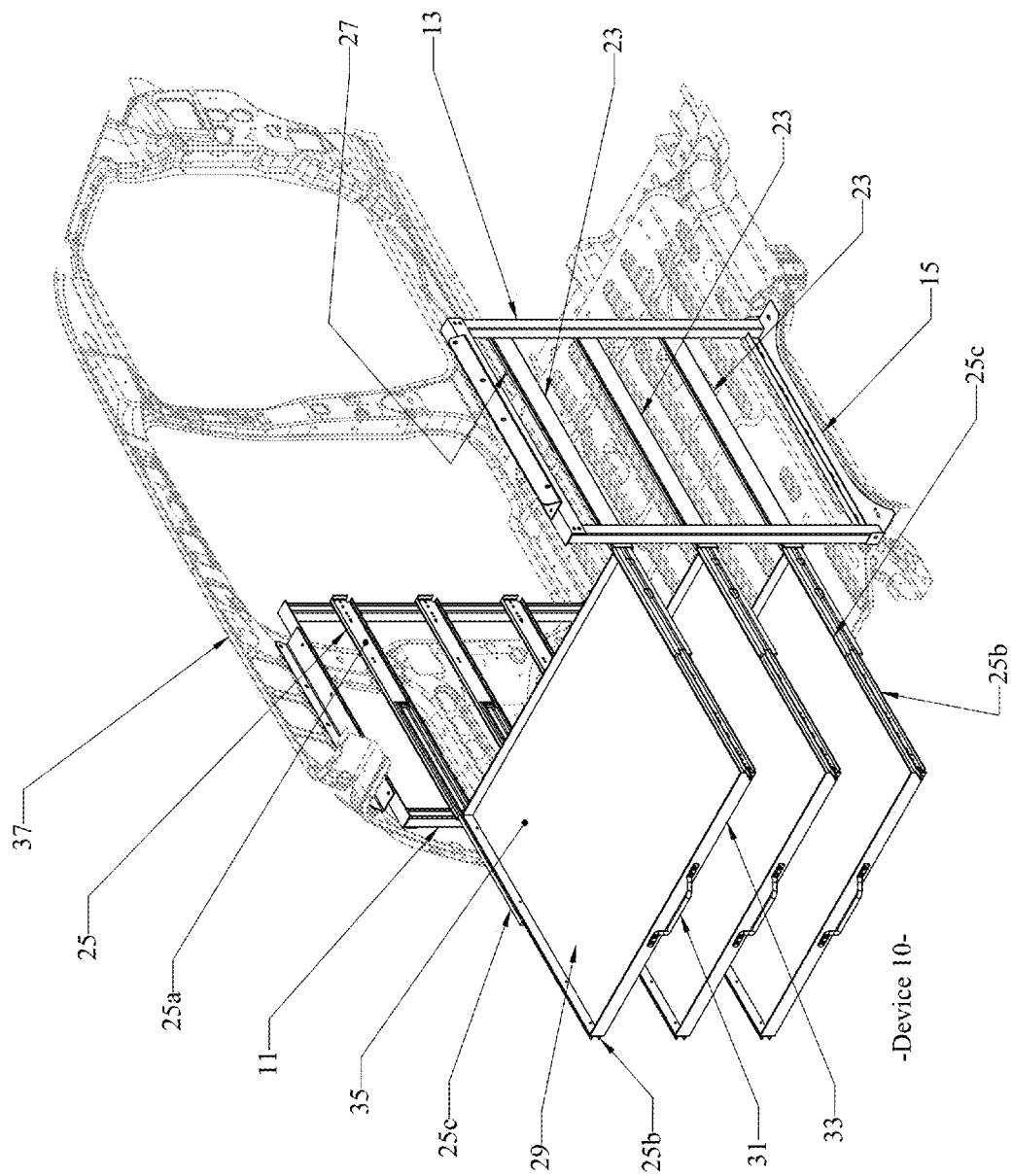
FIG. 2, is a perspective view of the device of FIG. 1 installed in a vehicle shown partially cut away and with trays about to be inserted.

Device 10 also includes at least one pair of guide members 25 and 27 mounted on each cross member 23, with one being mounted on each of the side panels 11 and 13. FIG. 2 illustrates three sets of guide members but any number from one to the number reaching the limit of the available space are contemplated by this invention. Guide members 25 and 27 are shown as "U" shaped, turned sideways so that the flat or middle portion 25a, in FIG. 2, is attached to a cross member 23 on side panel 11. The bottom portion 25b of guide member 25 extends out sufficiently to give a surface on which tray 29 rests, while top portion 25c of guide member 25 also extends out and functions to prevent tray 29 from tipping from a flat, horizontal orientation as shown in the figures. For example, if a heavy tool box, not shown, is placed on the front of tray 29 in FIG. 2, tray 29 will not tip because it engages top portion 25c of guide member 25.

Each pair of guide members 25 and 27 is designed to hold a tray 29 that may have a handle 31 thereon. Trays 29 are shown as having a raised rectangular frame 33 with a flat portion 35 on which objects may be placed as noted above. Frame 33 is metal, though other materials are also within the scope of this invention, just as the metal flat portion 35 may be made from cardboard, wood, plastic or other materials. Frame 33 preferably has sufficient strength that it resists bending when subjected to vertical loads, particularly when being inserted or removed into device 10.

Figure 3:
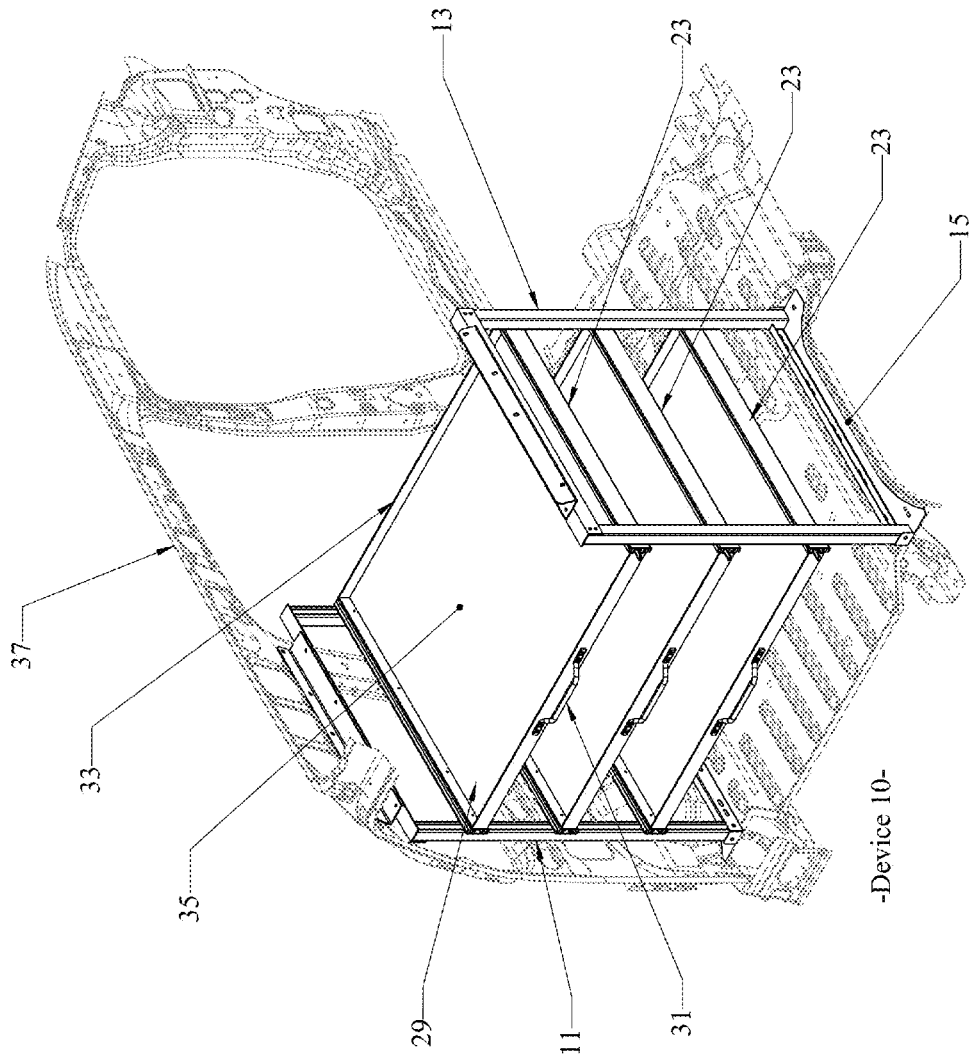
FIG. 3 is a perspective view of the device of FIG. 2, with the trays in place.

In FIGS. 2 and 3, device 10 is shown after being attached to the inside of a van type vehicle, though, as noted above, other areas may be used also. Van frame 37 supports device 10 by attachment thereto at bottom bracket 15 and top bracket 17 as described above.

Although the present invention has been described with reference to preferred embodiments, workers skilled in the art will recognize that changes may be made in form and detail without departing from the spirit and scope of the invention.

The invention claimed is:

1. A rack and tray device comprising:
a vehicle having a floor and opposite first and second side walls, the first and second side walls being supported by a frame of the vehicle;
a pair of spaced apart side panels having a front to back width and a bottom to top height sized to fit in the vehicle, the side panels extending parallel to one another adjacent the first side wall of the vehicle;
a cross member including a first end that engages one of the side panels and a second end that engages the other side panel;
a bottom mounting bracket connecting the bottom of one side panel with the bottom of the other side panel, the bottom mounting bracket being mounted on the floor of the vehicle;
a top mounting bracket connecting the top of one side panel with the top of the other side panel, the top mounting bracket being mounted on the frame adjacent the first side wall of the vehicle such that one of the side panels is spaced apart from the frame and the first side wall by at least one of the top and bottom mounting brackets;

at least one guide member slidably disposed within the cross member, the guide member including a channel shape extending inward;

at least one tray member having a frame and a flat portion that fits within the frame of the tray member, the frame of the tray member including a first end that is aligned with one of the side panels and a second end that is aligned with the other side panel, the frame of the tray member further including a rail fixed to a side surface of the frame of the tray member, the rail being slidably disposed within the channel shape of the guide member such that the tray member is carried by the channel shape and is maintained in a substantially horizontal orientation when objects are placed on the flat portion of the tray member.

2. The device of claim 1, where the pair of side panels are rectangular in shape and the top mounting bracket is an "L" shaped member attached to the top of the side panels with the vertical portion of the "L" shaped member proximate the outer edge of the side panels and positioned to be attached to the frame of the vehicle.

3. The device of claim 2, wherein the bottom bracket is in contact with the floor of the vehicle.

4. The device of claim 1, wherein the guide member channel shape comprises a "U" shape mounted with the bottom of the "U" shape vertically mounted on the side panels such that one side of the "U" shape supports the at least one tray member and the other side is above the at least one tray member and positioned to prevent the at least one tray member from movement toward the vertical.

5. The device of claim 1, wherein the vehicle has at least one door at its back and the device is mounted on the floor of the vehicle and the first side wall at a location in the vehicle proximate the door.

6. The device of claim 5, which includes a plurality of guide members each supporting a tray member, each tray member having a handle configured for inserting and removing the tray member.

7. A rack and tray device comprising:

a vehicle having a floor and opposite first and second side walls, the first and second side walls being supported by a frame of the vehicle;

a pair of side panels having a front to back width and a bottom to top height for mounting in the vehicle, the side panels extending parallel to one another adjacent the first side wall of the vehicle, and where the side panels are rectangular in shape and are connected by an "L" shaped member attached to the top of each of the side panels with the vertical portion of the "L" shaped member proximate to the outer edge of each of the side panels, the vertical portion being attached directly to the frame adjacent the first side wall of the vehicle;

a bottom mounting bracket connecting bottoms of the side panels, the bottom mounting bracket being mounted on the floor of the vehicle such that one of the side panels is spaced apart from the frame and the first side wall by at least one of the "L" shaped members and the bottom mounting bracket;

a cross member including a first end that engages one of the side panels and a second end that engages the other side panel;

a guide member slidably disposed within the cross member, the guide member being configured for holding a tray member, the guide member connecting the side panels and facing away from the side walls of the vehicle, the guide member including a channel shape extending inward;

at least one tray member having a frame and a flat portion that fits within the frame of the tray member, the frame of the tray member having a depth that is equal to a length of the cross member, the frame of the tray member including a rail fixed to a side surface of the frame of the tray member, the rail being slidably disposed within the channel shape of the guide member such that the at least one tray member is carried by the channel shape and is maintained in a substantially horizontal orientation when objects are placed on the flat portion of the at least one tray member.

8. The device of claim 7, wherein the bottom bracket extends along the bottom of the side panels and is in contact with the floor of the vehicle.

9. The device of claim 7, wherein the guide member channel shape comprises a "U" shape mounted with the bottom of the "U" shape vertically mounted on the side panels such that one side of the "U" shape supports the at least one tray member and the other side is above the at least one tray member and is positioned to prevent the at least one tray member from movement toward the vertical.

10. The device of claim 7 wherein the vehicle has at least one door at its back and the device is mounted on the floor of the vehicle and the first side wall at a location in the vehicle proximate to the door.

11. The device of claim 10, which includes a plurality of guide members each supporting a tray member, each having a handle configured for inserting and removing the tray member.

12. A rack and tray device comprising:

a vehicle having at least one door at its back, a floor and first and second side walls at a location in the vehicle proximate the door, the first and second side walls being supported by a frame of the vehicle;

a pair of spaced apart rectangular side panels having a front to back width and a bottom to top height to fit in the vehicle;

a bottom mounting bracket connecting the pair of side panels at bottom ends of the side panels, the bottom mounting bracket being mounted on the floor of the vehicle adjacent one of the first and second side walls;

a top mounting bracket connecting the side panels at top ends of the side panels, the to mounting brackets being mounted directly to a portion of the frame that supports the first side wall such that one of the side panels is spaced apart from the frame and a respective one of the first and second side walls by at least one of the top and bottom mounting brackets;

a cross member connecting the side panels;

at least one guide member slidably disposed within the cross member, the guide member including a channel shape extending inward, wherein the guide member channel shape comprises a "U" shape mounted with the bottom of the "U" shape vertically mounted on the side panels such that one side of the "U" shape is configured to support a tray member and the other side is above the tray member and positioned to prevent the tray member from movement toward the vertical; and at least one tray member having a rectangular frame and a flat portion that fits within the frame of the tray member, the frame of the tray member including a first end that is aligned with one of the side panels and a second end that is aligned with the other side panel, the frame of the tray member further including a rail fixed to a side surface of the frame of the tray member, the rail being slidably disposed within the channel shape of the guide member and the at least one tray member is carried by the channel shape and is maintained in a substantially horizontal orientation when objects are placed on the flat portion of the at least one tray member.

13. The device of claim 12, wherein the bottom of the pair of side panels extends along the bottom of the pair of rectangular side panels and is in contact with the floor of the vehicle.

14. The device of claim 12, which includes a plurality of guide members each supporting a tray, each tray having a handle for inserting and removing the tray.

15. The device of claim 12, wherein the guide member extends out as the at least one tray member is being moved out to further support the at least one tray member and prevent it from tipping or rotating to the vertical.

16. The device of claim 1, wherein both side panels are spaced apart from the first side wall of the vehicle.

17. The device of claim 1, wherein the top mounting bracket includes a first bolt hole, the frame of the vehicle includes a second bolt hole and a bolt extends through the first and second bolt holes to fix the top mounting bracket relative to the frame of the vehicle.

18. The device of claim 1, wherein the top mounting bracket includes a first bolt hole, the first side wall includes a second bolt hole and a bolt extends through the first and second bolt holes to fix the top mounting bracket relative to the first side wall.

19. The device of claim 1, wherein each of the side panels is spaced apart from the frame of the vehicle and the first side wall by the top and bottom mounting brackets.

20. The device of claim 1, further comprising:
a pair of spaced apart second side panels having a front to back width and a bottom to top height sized to fit in the vehicle, the second side panels extending parallel to one another adjacent the second side wall of the vehicle;
a second cross member including a first end that engages one of the second side panels and a second end that engages the other second side panel;
a second bottom mounting bracket connecting the bottom of one second side panel with the bottom of the other second side panel, the second bottom mounting bracket being mounted on the floor of the vehicle;
a second top mounting bracket connecting the top of one second side panel with the top of the other second side panel, the second top mounting bracket being mounted on the frame of the vehicle adjacent the second side wall of the vehicle such that at least one of the second side panels is spaced apart from the frame of the vehicle and the second side wall by the second top and bottom mounting brackets; and
at least one second guide member slidably disposed within the second cross member, the second guide member including a channel shape extending inward,
wherein the frame of the tray member comprises a second rail on a second side panel of the frame of the tray member, the second rail being slidably disposed within the channel shape of the second guide member.

* * * * *